(12) United States Patent
Da Costa Bras Lima et al.

(10) Patent No.: US 11,527,824 B2
(45) Date of Patent: *Dec. 13, 2022

(54) ELECTRONIC DEVICES HAVING TUNABLE ANTENNA GROUNDING RINGS

(71) Applicant: Apple Inc., Cupertino, CA (US)

(72) Inventors: Eduardo Jorge Da Costa Bras Lima, Santa Clara, CA (US); Yuko N. Kanagy, Sunnyvale, CA (US); Jiaxiao Niu, Shanghai (CN); Andrea Ruaro, San Jose, CA (US); Jayesh Nath, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,595

(22) Filed: Jun. 28, 2021

(65) Prior Publication Data

US 2021/0328338 A1    Oct. 21, 2021

Related U.S. Application Data

(63) Continuation-in-part of application No. 16/562,355, filed on Sep. 5, 2019, now Pat. No. 11,108,139.

(51) Int. Cl.
| | | |
|---|---|---|
| *H01Q 1/48* | (2006.01) | |
| *H01Q 1/27* | (2006.01) | |
| *H02J 50/10* | (2016.01) | |
| *H01Q 7/06* | (2006.01) | |

(52) U.S. Cl.
CPC ............. *H01Q 1/48* (2013.01); *H01Q 1/273* (2013.01); *H01Q 7/06* (2013.01); *H02J 50/10* (2016.02)

(58) Field of Classification Search
None
See application file for complete search history.

(56) References Cited

U.S. PATENT DOCUMENTS

| | | |
|---|---|---|
| 6,812,902 B2 | 11/2004 | Rossman et al. |
| 8,328,415 B2 | 12/2012 | Kachi et al. |
| 8,836,587 B2 | 9/2014 | Darnell et al. |
| 9,024,839 B2 | 5/2015 | Schneider et al. |
| 9,213,320 B2 | 12/2015 | Fujisawa |

(Continued)

FOREIGN PATENT DOCUMENTS

| | | |
|---|---|---|
| CN | 102591192 A | 7/2012 |
| KR | 20190101895 A | 9/2019 |

*Primary Examiner* — Anh Q Tran
(74) *Attorney, Agent, or Firm* — Treyz Law Group, P.C.; Michael H. Lyons

(57) ABSTRACT

An electronic device may include a rear housing wall, antenna resonating element, sensor board, and grounding ring. The grounding ring may couple antenna currents from the resonating element onto a ground trace on the sensor board. A switchable inductor may couple the grounding ring to the ground traces. The switchable inductor may be used to tune a frequency response of the antenna in a cellular low band. Additionally or alternatively, an inductor may couple the resonating element to the ground traces or other portions of an antenna ground. This inductor may serve to extend the effective length of the antenna resonating element in the cellular low band to compensate for dielectric loading by the rear housing wall, such as in examples where the rear housing wall is formed from zirconia.

20 Claims, 13 Drawing Sheets

(56) References Cited

U.S. PATENT DOCUMENTS

| | | |
|---|---|---|
| 9,444,141 B2 | 9/2016 | Asrani et al. |
| 9,658,604 B2 | 5/2017 | Nagahama |
| 9,716,312 B2 | 7/2017 | Chen et al. |
| 9,977,406 B2 | 5/2018 | Fujisawa |
| 10,116,346 B2 | 10/2018 | Kim et al. |
| 10,271,299 B1 | 4/2019 | Sayem et al. |
| 10,276,925 B2 | 4/2019 | Han et al. |
| 10,355,344 B1 | 7/2019 | Ruaro et al. |
| 10,411,327 B2 | 9/2019 | Kim et al. |
| 10,742,250 B1 | 8/2020 | Hiemstra et al. |
| 10,868,356 B1 * | 12/2020 | Da Costa Bras Lima .................. H01Q 1/273 |
| 2012/0178503 A1 | 7/2012 | Merz et al. |
| 2014/0153211 A1 | 6/2014 | Malek et al. |
| 2018/0048057 A1 | 2/2018 | Ehman et al. |
| 2018/0048058 A1 | 2/2018 | Ehman et al. |
| 2018/0090826 A1 | 3/2018 | Da Costa Bras Lima et al. |
| 2018/0159203 A1 | 6/2018 | Baks et al. |
| 2019/0027802 A1 | 1/2019 | Noori et al. |
| 2019/0074586 A1 | 3/2019 | Ruaro et al. |
| 2019/0212436 A1 | 7/2019 | Baheti et al. |

* cited by examiner

ELECTRONIC DEVICES HAVING TUNABLE ANTENNA GROUNDING RINGS

This application is a continuation-in-part of U.S. patent application Ser. No. 16/562,355, filed Sep. 5, 2019, which is incorporated by reference herein in its entirety.

BACKGROUND

This relates to electronic devices, and more particularly, to electronic devices with wireless circuitry.

Electronic devices are often provided with wireless communications capabilities. To satisfy consumer demand for small form factor electronic devices, manufacturers are continually striving to implement wireless circuitry such as antenna components using compact structures.

At the same time, larger antenna volumes generally allow antennas to exhibit greater efficiency bandwidth. In addition, because antennas have the potential to interfere with each other and with other components in a wireless device, care must be taken when incorporating antennas into an electronic device to ensure that the antennas and wireless circuitry are able to exhibit satisfactory performance over a wide range of operating frequencies.

It would therefore be desirable to be able to provide improved wireless circuitry for electronic devices.

SUMMARY

An electronic device such as a wristwatch may be provided with a housing, wireless circuitry, and a battery. The device may include a display at a front face of the housing. The housing may include a rear housing wall at a rear face of the housing. The wireless circuitry may include coil structures and an antenna having an antenna resonating element. The antenna resonating element may transmit and receive radio-frequency signals at a first frequency through the rear housing wall. The coil structures may receive wireless charging signals at a second frequency that is less than the first frequency through the rear housing wall. The wireless charging signals may be used to charge the battery. A sensor board may be mounted at the rear housing wall and may include sensors that gather sensor data through the rear housing wall.

An axis may extend through a lateral surface of the sensor board. The coil structures and the antenna resonating element may follow loop paths around the axis. The antenna resonating element may laterally surround the coil structures and the sensor board. Ferrite structures may be included in the coil structures. Ground traces on the sensor board may form part of the antenna. If care is not taken, the radio-frequency signals conveyed by the antenna resonating element may produce currents on the coil structures that are lost to the ferrite structures, thereby limiting efficiency for the antenna.

To mitigate these issues, antenna grounding ring structures may be provided for the antenna. The antenna grounding ring structures may be formed from concentric ring-shaped traces on a flexible printed circuit. The ring-shaped traces may laterally extend around the axis and may partially overlap the antenna resonating element. Antenna currents at the first frequency (e.g., in a lower frequency resonant mode of the antenna) may be coupled onto the ring-shaped traces by near-field capacitive coupling. The coil structures may receive the wireless charging signals through the antenna grounding ring structures.

The ring-shaped traces may be separated by at least one gap. The ring-shaped traces and the at least one gap may configure the antenna grounding ring structures to short antenna currents at the first frequency from the antenna resonating element to the ground trace on the sensor board while blocking currents at the second frequency from flowing between the ring-shaped traces. This may allow the ground traces to form part of the antenna, thereby maximizing antenna volume and efficiency bandwidth, without substantially impairing the wireless charging efficiency of the coil structures.

A switchable inductor may couple the antenna grounding ring structures to the ground traces on the sensor board. The switchable inductor may be used to increase antenna bandwidth (e.g., to cover low frequencies at around 600 MHz for LTE band B71). Additionally or alternatively, an inductor may couple the antenna resonating element to the ground traces on the sensor board or other portions of the antenna ground. The inductor may serve to extend the effective electrical length of the antenna resonating element similar to the effect of loading the rear housing wall with Zirconia or other high permittivity material. When reducing the permittivity of the rear housing wall such as using plastic to form the rear housing wall, the inductor may compensate for the reduction of electrical length.

DETAILED DESCRIPTION

Figure 1:
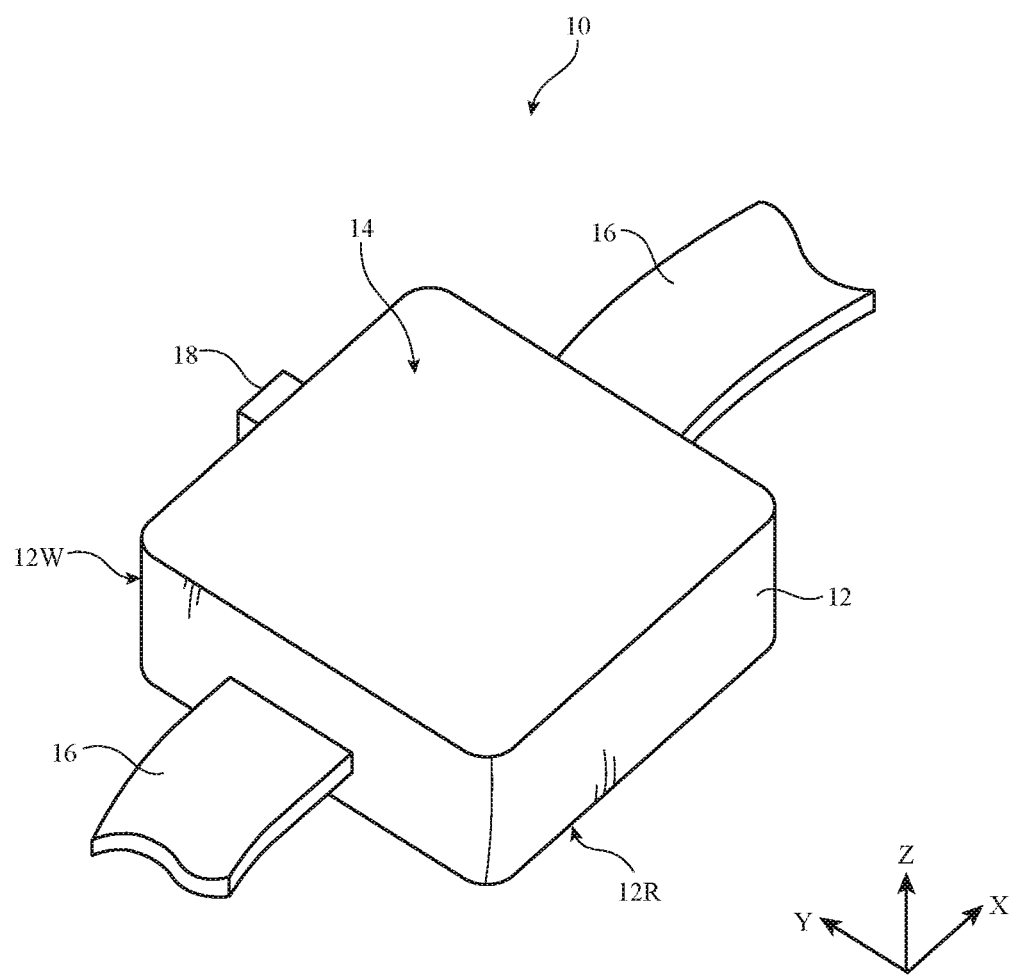
FIG. 1 is a perspective view of an illustrative electronic device with wireless circuitry in accordance with some embodiments.

Electronic devices such as electronic device 10 of FIG. 1 may be provided with wireless circuitry (sometimes referred to herein as wireless communications circuitry). The wireless circuitry may be used to support wireless communications in multiple wireless communications bands. Communications bands (sometimes referred to herein as frequency bands) handled by the wireless circuitry can include satellite navigation system communications bands, cellular telephone communications bands, wireless local area network communications bands, wireless personal area network communications bands, near-field communications bands, ultra-wideband communications bands, or other wireless communications bands.

The wireless circuitry may include one or more antennas. The antennas of the wireless circuitry can include loop antennas, inverted-F antennas, strip antennas, planar inverted-F antennas, patch antennas, slot antennas, hybrid antennas that include antenna structures of more than one type, or other suitable antennas.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a wristwatch (e.g., a smart watch). Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W or sidewalls formed from other materials. Examples of metal materials that may be used for forming sidewalls 12W include stainless steel, aluminum, silver, gold, metal alloys, or any other desired conductive material. Sidewalls 12W may sometimes be referred to herein as housing sidewalls 12W or conductive housing sidewalls 12W.

Display 14 may be formed at (e.g., mounted on) the front side (face) of device 10. Housing 12 may have a rear housing wall on the rear side (face) of device 10 such as rear housing wall 12R that opposes the front face of device 10. Conductive housing sidewalls 12W may surround the periphery of device 10 (e.g., conductive housing sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic, wood, polymer, combinations of these materials, or any other desired dielectrics.

Rear housing wall 12R and/or display 14 may extend across some or all of the length (e.g., parallel to the X-axis of FIG. 1) and width (e.g., parallel to the Y-axis) of device 10. Conductive housing sidewalls 12W may extend across some or all of the height of device 10 (e.g., parallel to Z-axis). Conductive housing sidewalls 12W and/or rear housing wall 12R may, form one or more exterior surfaces of device 10 (e.g., surfaces that are visible to a user of device 10) and/or may be implemented using internal structures that do not form exterior surfaces of device 10 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide housing walls 12R and/or 12W from view of the user).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. Display 14 may also be force sensitive and may gather force input data associated with how strongly a user or object is pressing against display 14.

Display 14 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies. Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include buttons such as button 18. There may be any suitable number of buttons in device 10 (e.g., a single button, more than one button, two or more buttons, five or more buttons, etc.). Buttons may be located in openings in housing 12 (e.g., openings in conductive housing sidewall 12W or rear housing wall 12R) or in an opening in display 14 (as examples). Buttons may be rotary buttons, sliding buttons, buttons that are actuated by pressing on a movable button member, etc. Button members for buttons such as button 18 may be formed from metal, glass, plastic, or other materials. Button 18 may sometimes be referred to as a crown in scenarios where device 10 is a wristwatch device.

Device 10 may, if desired, be coupled to a strap such as strap 16. Strap 16 may be used to hold device 10 against a user's wrist (as an example). Strap 16 may sometimes be referred to herein as wrist strap 16. In the example of FIG. 1, wrist strap 16 is connected to opposing sides of device 10. Conductive housing sidewalls 12W may include attachment structures for securing wrist strap 16 to housing 12 (e.g., lugs or other attachment mechanisms that configure housing 12 to receive wrist strap 16). Configurations that do not include straps may also be used for device 10.

Figure 2:
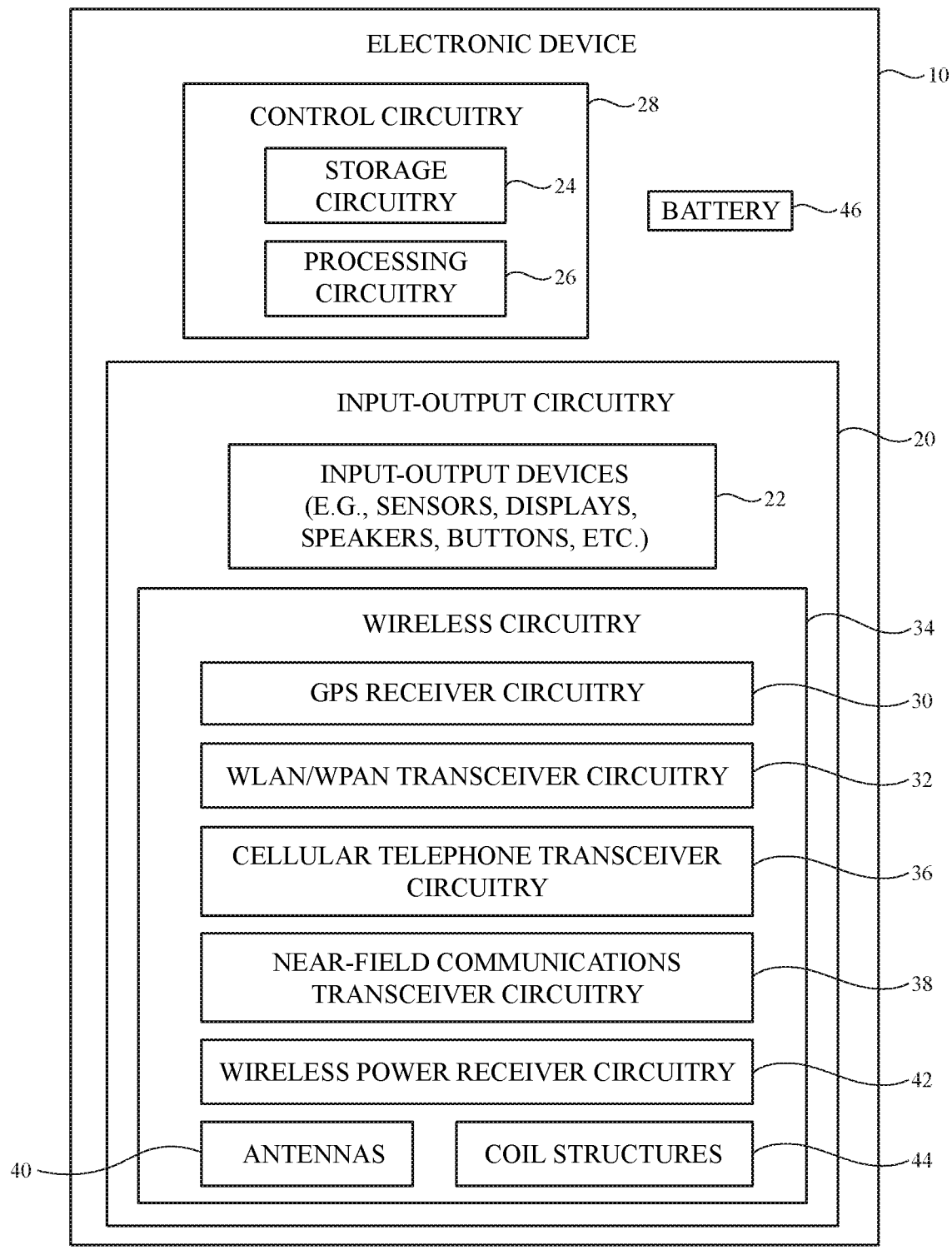
FIG. 2 is a schematic diagram of an illustrative electronic device with wireless circuitry in accordance with some embodiments.

A schematic diagram showing illustrative components that may be used in device 10 is shown in FIG. 2. As shown in FIG. 2, device 10 may include control circuitry 28. Control circuitry 28 may include storage such as storage circuitry 24. Storage circuitry 24 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 26. Processing circuitry 26 may be used to control the operation of device 10. Processing circuitry 26 may include on one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 24 (e.g., storage circuitry 24 may include non-transitory (tangible) computer readable storage media that stores the software code). The software code may sometimes be referred to as program instructions, software, data, instructions, or code. Software code stored on storage circuitry 24 may be executed by processing circuitry 26.

Control circuitry 28 may be used to run software on device 10 such as external node location applications, satellite navigation applications, internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, MIMO protocols, antenna diversity protocols, satellite navigation system protocols (e.g., global positioning system (GPS) protocols, global navigation satellite system (GLONASS) protocols, etc.), IEEE 802.15.4 ultra-wideband communications protocols or other ultra-wideband communications protocols, etc. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch screens, displays without touch sensor capabilities, buttons, scrolling wheels, touch pads, key pads, keyboards, microphones, cameras, buttons, speakers, status indicators, light sources, audio jacks and other audio port components, vibrators or other haptic feedback engines, digital data port devices, light sensors (e.g., infrared light sensors, visible light sensors, etc.), light-emitting diodes, motion sensors (accelerometers), capacitance sensors, proximity sensors, magnetic sensors, force sensors (e.g., force sensors coupled to a display to detect pressure applied to the display), etc.

Input-output circuitry 22 may include wireless circuitry 34. Wireless circuitry 34 may include wireless power receiving coil structures such as coil structures 44 and wireless power receiver circuitry such as wireless power receiver circuitry 42. Device 10 may use wireless power receiver circuitry 42 and coil structures 44 to receive wirelessly transmitted power (e.g., wireless charging signals) from a wireless power adapter (e.g., a wireless power transmitting device such as a wireless charging mat or other device). Coil structures 44 may include one or more inductive coils that use resonant inductive coupling (near field electromagnetic coupling) with a wireless power transmitting coil on the wireless power adapter.

The wireless power adapter may pass AC currents through the wireless power transmitting coil to produce a time varying electromagnetic (e.g., magnetic) field that is received as wireless power (wireless charging signals) by coil structures 44 in device 10. An illustrative frequency for the wireless charging signals is 200 kHz. Other frequencies may be used, if desired (e.g., frequencies in the kHz range, the MHz range, or in the GHz range, frequencies of 1 kHz to 1 MHz, frequencies of 1 kHz to 100 MHz, frequencies less than 100 MHz, frequencies less than 1 MHz, etc.). When the time varying electromagnetic field is received by coil structures 44, corresponding alternating-current (AC) currents are induced in the coil structures. Wireless power receiver circuitry 42 may include converter circuitry such as rectifier circuitry. The rectifier circuitry may include rectifying components such as synchronous rectification metal-oxide-semiconductor transistors arranged in a bridge network, and may convert these currents from coil structures 44 into a DC voltage for powering device 10. The DC voltage produced by the rectifier circuitry in wireless power receiver circuitry 42 can be used in powering (charging) an energy storage device such as battery 46 and can be used in powering other components in device 10.

To support wireless communications, wireless circuitry 34 may include radio-frequency (RF) transceiver circuitry formed from one or more integrated circuits, power amplifier circuitry, low-noise input amplifiers, passive RF components, one or more antennas such as antennas 40, transmission lines, and other circuitry for handling RF wireless signals. Wireless signals can also be sent using light (e.g., using infrared communications).

Wireless circuitry 34 may include radio-frequency transceiver circuitry for handling various radio-frequency communications bands. For example, wireless circuitry 34 may include wireless local area network (WLAN) and wireless personal area network (WPAN) transceiver circuitry 32. Transceiver circuitry 32 may handle 2.4 GHz and 5 GHz bands for WiFi® (IEEE 802.11) communications or other WLAN bands and may handle the 2.4 GHz Bluetooth® communications band or other WPAN bands. Transceiver circuitry 32 may sometimes be referred to herein as WLAN/WPAN transceiver circuitry 32.

Wireless circuitry 34 may use cellular telephone transceiver circuitry 36 for handling wireless communications in frequency ranges (communications bands) such as a cellular low band (LB) from 600 to 960 MHz, a cellular low-midband (LMB) from 1410 to 1510 MHz, a cellular midband (MB) from 1710 to 2170 MHz, a cellular high band (HB) from 2300 to 2700 MHz, a cellular ultra-high band (UHB) from 3300 to 5000 MHz, or other communications bands between 600 MHz and 5000 MHz or other suitable frequencies (as examples). Cellular telephone transceiver circuitry 36 may handle voice data and non-voice data.

Wireless circuitry 34 may include satellite navigation system circuitry such as Global Positioning System (GPS) receiver circuitry 30 for receiving GPS signals at 1575 MHz or for handling other satellite positioning data (e.g., GLONASS signals at 1609 MHz). Satellite navigation system signals for receiver circuitry 30 are received from a constellation of satellites orbiting the earth. Wireless circuitry 34 can include circuitry for other short-range and long-range wireless links if desired. For example, wireless circuitry 34 may include circuitry for receiving television and radio signals, paging system transceivers, near field communications (NFC) transceiver circuitry 38 (e.g., an NFC transceiver operating at 13.56 MHz or another suitable frequency), etc.

In NFC links, wireless signals are typically conveyed over a few inches at most. In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet. Antenna diversity schemes may be used if desired to ensure that the antennas that have become blocked or that are otherwise degraded due to the operating environment of device 10 can be switched out of use and higher-performing antennas used in their place.

Wireless circuitry 34 may include antennas 40. Antennas 40 may be formed using any suitable antenna types. For example, antennas 40 may include antennas with resonating elements that are formed from slot antenna structures, loop antenna structures, patch antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, hybrids of these designs, etc. If desired, one or more of antennas 40 may be cavity-backed antennas.

Different types of antennas may be used for different bands and combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. For example, a single antenna 40 in device 10 may be used to handle communications in a WiFi® or Bluetooth® communication band at 2.4 GHz, a GPS communications band at 1575 MHz, a WiFi® or Bluetooth® communications band at 5.0 GHz, and one or more cellular telephone communications bands such as a cellular low band between about 600 MHz and 960 MHz and/or a cellular midband between about 1700 MHz and 2200 MHz. If desired, a combination of antennas for covering multiple frequency bands and dedicated antennas for covering a single frequency band may be used.

It may be desirable to implement at least some of the antennas in device 10 using portions of electrical components that would otherwise not be used as antennas and that support additional device functions. As an example, it may be desirable to induce antenna currents in components such as display 14 (FIG. 1), so that display 14 and/or other electrical components (e.g., a touch sensor, near-field communications loop antenna, conductive display assembly or housing, conductive shielding structures, etc.) can serve as part of an antenna for Wi-Fi, Bluetooth, GPS, cellular frequencies, and/or other frequencies without the need to incorporate separate bulky antenna structures in device 10. Conductive portions of housing 12 (FIG. 1) may be used to form part of an antenna ground for one or more antennas 40.

Figure 3:
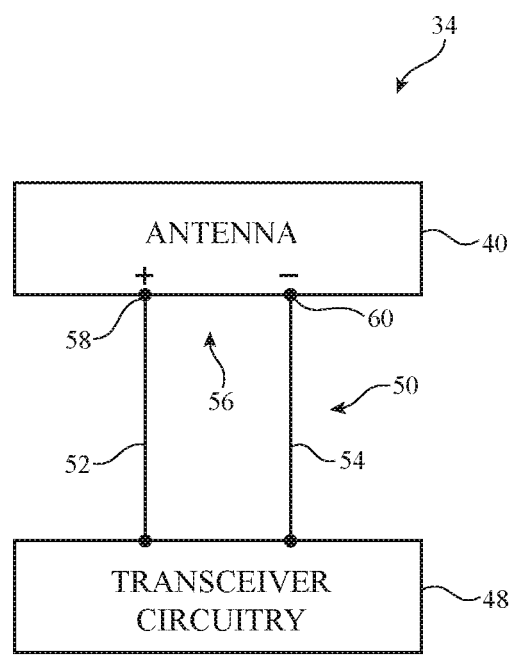
FIG. 3 is a diagram of illustrative wireless circuitry in an electronic device in accordance with some embodiments.

A schematic diagram of wireless circuitry 34 is shown in FIG. 3. As shown in FIG. 3, wireless circuitry 34 may include transceiver circuitry 48 (e.g., cellular telephone transceiver circuitry 36 of FIG. 2, WLAN/WPAN transceiver circuitry 32, etc.) that is coupled to a given antenna 40 using a radio-frequency transmission line path such as radio-frequency transmission line path 50.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line path 50 may include one or more radio-frequency transmission lines (sometimes referred to herein simply as transmission lines). Radio-frequency transmission line path 50 (e.g., the transmission lines in radio-frequency transmission line path 50) may include a positive signal conductor such as signal conductor 52 and a ground signal conductor such as ground conductor 54.

The transmission lines in radio-frequency transmission line path 50 may, for example, include coaxial cable transmission lines (e.g., ground conductor 54 may be implemented as a grounded conductive braid surrounding signal conductor 52 along its length), stripline transmission lines (e.g., where ground conductor 54 extends along two sides of signal conductor 52), a microstrip transmission line (e.g., where ground conductor 54 extends along one side of signal conductor 52), coaxial probes realized by a metalized via, edge-coupled microstrip transmission lines, edge-coupled stripline transmission lines, waveguide structures (e.g., coplanar waveguides or grounded coplanar waveguides), combinations of these types of transmission lines and/or other transmission line structures, etc.

Transmission lines in radio-frequency transmission line path 50 may be integrated into rigid and/or flexible printed circuit boards. In one suitable arrangement, radio-frequency transmission line path 50 may include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Radio-frequency transmission line path 50 may be coupled to antenna feed structures associated with antenna 40. As an example, antenna 40 may form an inverted-F antenna, a planar inverted-F antenna, a patch antenna, a loop antenna, or other antenna having an antenna feed 56 with a positive antenna feed terminal such as terminal 58 and a ground antenna feed terminal such as terminal 60. Positive antenna feed terminal 58 may be coupled to an antenna resonating (radiating) element within antenna 40. Ground antenna feed terminal 60 may be coupled to an antenna ground in antenna 40. Signal conductor 52 may be coupled to positive antenna feed terminal 58 and ground conductor 54 may be coupled to ground antenna feed terminal 60.

Other types of antenna feed arrangements may be used if desired. For example, antenna 40 may be fed using multiple feeds each coupled to a respective port of transceiver circuitry 48 over a corresponding transmission line. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between transceiver circuitry 48 and the positive antenna feed terminals if desired (e.g., to selectively activate one or more positive antenna feed terminals at any given time). The illustrative feeding configuration of FIG. 3 is merely illustrative.

Device 10 may include multiple antennas that convey radio-frequency signals through different sides of device 10. For example, device 10 may include at least first antenna that conveys radio-frequency signals through the front face of device 10 (e.g., display 14 of FIG. 1) and a second antenna that conveys radio-frequency signals through the rear face of device 10 (e.g., rear housing wall 12R of FIG. 1).

Figure 4:
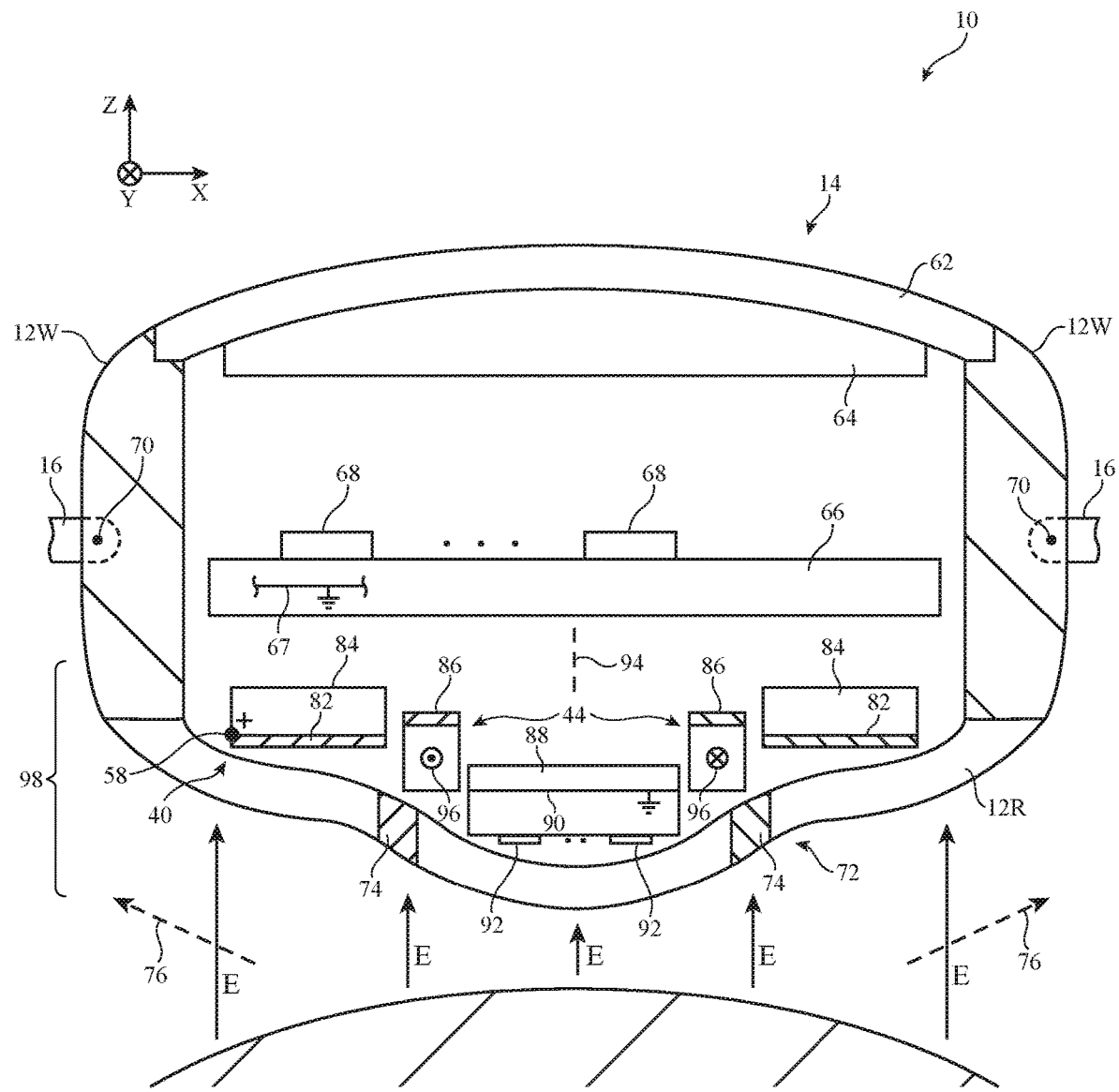
FIG. 4 is a cross-sectional side view of an illustrative electronic device having an antenna overlapping a rear housing wall in accordance with some embodiments.

FIG. 4 is a cross-sectional side view of electronic device 10 showing how a given antenna 40 may be mounted within device 10 for conveying (radiating) radio-frequency signals through rear housing wall 12R. As shown in FIG. 4, display 14 may form the front face of device 10 whereas rear housing wall 12R forms the rear face of device 10. In the example of FIG. 4, rear housing wall 12R is formed from a dielectric material such as glass, sapphire, zirconi, ceramic, or plastic. This is merely illustrative and, if desired, rear housing wall 12R may also include conductive portions (e.g., a conductive frame surrounding one or more dielectric windows in rear housing wall 12R, conductive cosmetic layers, etc.). Conductive housing sidewalls 12W may extend from the rear face to the front face of device 10 (e.g., from rear housing wall 12R to display 14).

Strap 16 may be secured to conductive housing sidewalls 12W using corresponding attachment structures 70. Attachment structures 70 may include lugs, spring structures, clasp structures, adhesive structures, or any other desired attachment mechanisms. Strap 16 may be formed using any desired materials (e.g., metal materials, dielectric materials, or combinations of metal and dielectric materials). If desired, strap 16 may be removed from attachment structures 70 (e.g., so that a user of device 10 can swap in different straps having similar or different materials).

Display 14 may include a display module 64 (sometimes referred to herein as display stack 64, display assembly 64, or active area 64 of display 14) and a display cover layer 62. Display module 64 may, for example, form an active area or portion of display 14 that displays images and/or receives touch sensor input. The lateral portion of display 14 that does not include display module 64 (e.g., portions of display 14 formed from display cover layer 62 but without an underlying portion of display module 64) may sometimes be referred to herein as the inactive area or portion of display 14 because this portion of display 14 does not display images or gather touch sensor input.

Display module 64 may include conductive components (sometimes referred to herein as conductive display structures) that are used in forming portions of an antenna that radiates through the front face of device 10 (e.g., an antenna having a radiating element such as a radiating slot element defined by display module 64 and/or conductive housing sidewalls 12W). The conductive display structures in display module 64 may, for example, have planar shapes (e.g., planar rectangular shapes, planar circular shapes, etc.) and may be formed from metal and/or other conductive material that carries antenna currents for a front-facing antenna in device 10. The conductive display structures may include a frame for display module 64, pixel circuitry, touch sensor electrodes, an embedded near-field communications antenna, etc.

Display cover layer 62 may be formed from an optically transparent dielectric such as glass, sapphire, ceramic, or plastic. Display module 64 may display images (e.g., emit image light) through display cover layer 62 for view by a user and/or may gather touch or force sensor inputs through display cover layer 62. If desired, portions of display cover layer 62 may be provided with opaque masking layers (e.g., ink masking layers) and/or pigment to obscure the interior of device 10 from view of a user.

Substrates such as substrate 66 (e.g., a rigid or flexible printed circuit board, integrated circuit or chip, integrated circuit package, etc.) may be located within the interior of device 10. Substrate 66 may be, for example, a main logic board (MLB) or other logic board for device 10. Other components such as components 68 (e.g., components used in forming control circuitry 28 and/or input-output circuitry 20 of FIG. 2, battery 46, etc.) may be mounted to substrate 66 and/or elsewhere within the interior of device 10.

As shown in FIG. 4, a given antenna 40 may be mounted within device 10 for radiating through rear housing wall 12R. Ground traces 67 may be formed on substrate 66 and may form part of the antenna ground for antenna 40. Conductive housing sidewalls 12W may also form part of the antenna ground for antenna 40 (e.g., ground traces 67 on substrate 66 may be electrically shorted to conductive housing sidewalls 12W). Conductive portions of other components in device 10 may also form part of the antenna ground for antenna 40 (e.g., ground traces 67 on substrate 66, conductive housing sidewalls 12W, and/or conductive portions of other components in device 10 may be held at a ground or reference potential).

Antenna 40 may include an antenna resonating element 82 formed from conductive traces on a substrate such as substrate 84. Substrate 84 may be a plastic substrate, a flexible printed circuit substrate, a rigid printed circuit substrate, a ceramic substrate, or any other desired dielectric substrate. The conductive traces in antenna resonating element 82 (sometimes referred to herein as antenna radiating element 82, resonating element 82, radiating element 82, or antenna element 82) may, for example, be patterned onto substrate 84 using a laser direct structuring (LDS) process. In another suitable arrangement, antenna resonating element 82 may be formed from metal foil, layers of sheet metal, conductive portions of the housing for device 10, etc.

Antenna resonating element 82 may be a patch antenna resonating element, an inverted-F antenna resonating element, a planar inverted-F antenna resonating element, a monopole resonating element, a dipole resonating element, a loop resonating element, another type of antenna resonating element, and/or a combination of these types of antenna resonating elements. If desired, antenna resonating element 82 and/or substrate 84 may laterally extend circumferentially around central axis 94 (e.g., antenna resonating element 82 may lie within a given plane or surface and may have a loop shape that extends around an opening, where central axis 94 runs orthogonally through the opening). Positive antenna feed terminal 58 for antenna 40 may be coupled to antenna resonating element 82. The ground antenna feed terminal for antenna 40 (not shown in FIG. 4 for the sake of clarity) may be coupled to conductive housing sidewalls 12W, ground traces 67 on substrate 66, or any other desired portion of the antenna ground for antenna 40.

Rear housing wall 12R may extend across substantially all of the length and width of device 10 (e.g., in the X-Y plane). Rear housing wall 12R may be optically opaque or optically transparent or may include both optically opaque and optically transparent portions (e.g., rear housing wall 12R may include optically transparent windows in an otherwise optically opaque member). Antenna resonating element 82 may overlap rear housing wall 12R and may, if desired, be spaced apart from rear housing wall 12R, pressed against rear housing wall 12R, adhered to rear housing wall 12R, etc. In this way, antenna 40 may be formed at or adjacent to the rear face of device 10 for radiating through rear housing wall 12R. If desired, antenna resonating element 82 may conform to the shape of the interior surface of rear housing wall 12R (e.g., antenna resonating element 82 need not be planar). In the example of FIG. 4, the interior surface of rear housing wall 12R has a slightly curved or concave shape (e.g., to form a protruding portion 72 that increases the total volume for components within device 10 relative to scenarios where the interior surface of rear housing wall 12R is flat).

Antenna 40 may transmit and receive radio-frequency signals (e.g., in at least the cellular low band, the cellular low-midband, the cellular midband, and/or the cellular high band) through rear housing wall 12R. The radio-frequency signals transmitted by antenna 40 may be shielded from electrical components 68 and the antenna at the front face of device 10 by ground traces 67 on substrate 66, for example.

Similarly, ground traces 67 and substrate 66 may shield antenna 40 from components 68 and the antenna at the front face of device 10, thereby maximizing isolation between the antennas in device 10 despite the relatively small size of device 10.

By forming antenna 40 at rear housing wall 12R, the vertical height of device 10 (e.g., parallel to the Z-axis of FIG. 4) may be shorter than would otherwise be possible in scenarios where the corresponding antenna resonating element is located elsewhere on device 10 (while still allowing antenna 40 to exhibit satisfactory antenna efficiency). As an example, the vertical height of device 10 may be less than or equal to 11.4 mm, less than 15 mm, between 8 and 11.4 mm, or any other desired height while still allowing antenna 40 to operate with satisfactory antenna efficiency.

In practice, the wireless performance of antenna 40 may be optimized by the presence of an external object adjacent to rear housing wall 12R. For example, the presence of the user's wrist 80 adjacent to rear housing wall 12R when the user is wearing device 10 may enhance the wireless performance of antenna 40. During operation, antenna 40 may transmit and/or receive radio-frequency signals having electric fields (E) that are oriented normal to the surfaces of rear housing wall 12R and wrist 80. These signals may sometimes be referred to as surface waves, which are then propagated along the surface of wrist 80 and outwards, as shown by paths 76 (e.g., antenna resonating element 82 and wrist 80 may serve as a waveguide that directs the surface waves outwards). This may allow the radio-frequency signals conveyed by antenna 40 to be properly received by external communications equipment (e.g., a wireless base station) even though antenna 40 is located close to wrist 80 and typically pointed away from the external communications equipment.

If desired, a sensor board such as sensor board 88 may be mounted within device 10 at or adjacent to rear housing wall 12R. Central axis 94 may extend (e.g., orthogonally) through a lateral surface of sensor board 88. Sensor board 88 may be separated from rear housing wall 12R, pressed against rear housing wall 12R, adhered to rear housing wall 12R, etc. Sensor board 88 may overlap protruding portion 72 of rear housing wall 12R and may be partially or completely located within protruding portion 72. Sensor board 88 may include a rigid printed circuit board, flexible printed circuit, integrated circuit chip, integrated circuit package, plastic substrate, or other substrates for supporting one or more sensors 92 (e.g., one or more sensors 92 may be mounted to sensor board 88). Sensors 92 may, for example, include sensors in input-output devices 22 of FIG. 2.

If desired, sensor electrodes 74 may be formed at or on rear housing wall 12R (e.g., sensor electrodes 74 may be at least partially embedded within the dielectric material of rear housing wall 12R as shown in FIG. 4). In this example, sensor electrodes 74 may be coupled to sensor circuitry on sensor board 88 using one or more conductive paths (not shown in FIG. 4 for the sake of clarity). Sensor electrodes 74 may, for example, be electrocardiogram (ECG or EKG) electrodes. Sensor circuitry on sensor board 74 may sense the electrical activity of a user's heart using sensor electrodes 74 while the user wears device 10, for example. In another suitable arrangement, sensor electrodes 74 may be mounted to sensor board 88. Sensor board 88 may include ground traces 90. Ground traces 90 may be held at a ground or reference potential. If desired, ground traces 90 may be shorted to conductive housing sidewalls 12W, ground traces 67, or other ground structures in device 10.

Sensors 92 may include one or more sensors such as a light sensor, proximity sensor, touch sensor, or other sensors. As one example, sensors 92 may include at least one infrared light emitter and at least one infrared light sensor. The infrared light emitter may emit infrared light through rear housing wall 12R (e.g., through an infrared-transparent window in rear housing wall 12R). The infrared light sensor may receive a reflected version of the emitted infrared light that has been reflected off of an external object in the vicinity of device 10 such as wrist 80 of a user (e.g., a user who is wearing device 10 on their wrist in scenarios where device 10 is a wristwatch). This example is merely illustrative and, if desired, sensors 92 may include any other desired components or may be omitted.

Coil structures 44 may also be mounted within device 10 at or adjacent to rear housing wall 12R. Coil structures 44 may be spaced apart from rear housing wall 12R, pressed against rear housing wall 12R, adhered to rear housing wall 12R, etc. As shown in FIG. 4, antenna 40 (e.g., antenna resonating element 82) may laterally extend around (surround) coil structures 44 (e.g., coil structures 44 may lie within an opening in antenna resonating element 82). Coil structures 44 may also circumferentially surround central axis 94 (e.g., coil structures 44 may laterally extend around central axis 94 within the X-Y plane or another surface). In this way, coil structures 44 and antenna 40 may extend concentrically around central axis 94. Coil structures 44 may laterally surround sensor board 88 and/or an opening that overlaps sensor board 88.

Coil structures 44 may receive wireless charging signals through rear housing wall 12R (e.g., when device 10 is placed on a wireless power adapter or other wireless power transmitting device). The wireless charging signals may induce currents on coil structures 44 that are used by wireless power receiver circuitry 42 for charging battery 46 (FIG. 2). Coil structures 44 may include a single conductive coil (e.g., an inductive coil) or more than one conductive coil. In one suitable arrangement, coil structures 44 may include a first coil with windings that coil (wind) around central axis 94 and a second coil with windings that extend perpendicular to the windings in the first coil. The second coil may, for example, include windings that coil (wind) around axis 96 (e.g., a ring-shaped axis that loops around central axis 94 and lies within the X-Y plane). The windings in the first and second coils may include conductive wire (e.g., copper wire), conductive traces, or any other desired conductive material.

Coil structures 44 may include ferrite structures such as ferrite structures 86. Ferrite structures 86 may include ferrite shield structures that help to electromagnetically shield coil structures 44 from other components in device 10. If desired, ferrite structures 86 may additionally or alternatively include one or more ferrite cores for the windings in coil structures 44 (e.g., the windings in coil structures 44 may be wound around the ferrite core(s)). Ferrite cores in coil structures 44 may help to maximize the wireless charging efficiency for device 10.

In general, the volume of antenna 40 may be proportional to the efficiency bandwidth of the antenna. While it may be desirable to maximize the volume and thus the efficiency bandwidth of antenna 40, if care is not taken, the small size of device 10 may serve to limit the efficiency bandwidth of antenna 40. In order to increase the effective volume of antenna 40 and thus the efficiency bandwidth of antenna 40, ground traces 90 on sensor board 88 may be used to form part of the antenna ground for antenna 40.

When ground traces 90 are used to form part of the antenna ground for antenna 40, radio-frequency signals conveyed by antenna resonating element 82 may induce currents on coil structures 44 (e.g., due to the close proximity of coil structures 44 to sensor board 88 and antenna resonating element 82). Ferrite structures 86 may block the currents induced on coil structures 44, which may introduce signal losses that limit the overall antenna efficiency for antenna 40. If desired, antenna grounding ring structures may be used to allow antenna 40 to include ground traces 90 without introducing losses associated with coil structures 44.

Figure 5:
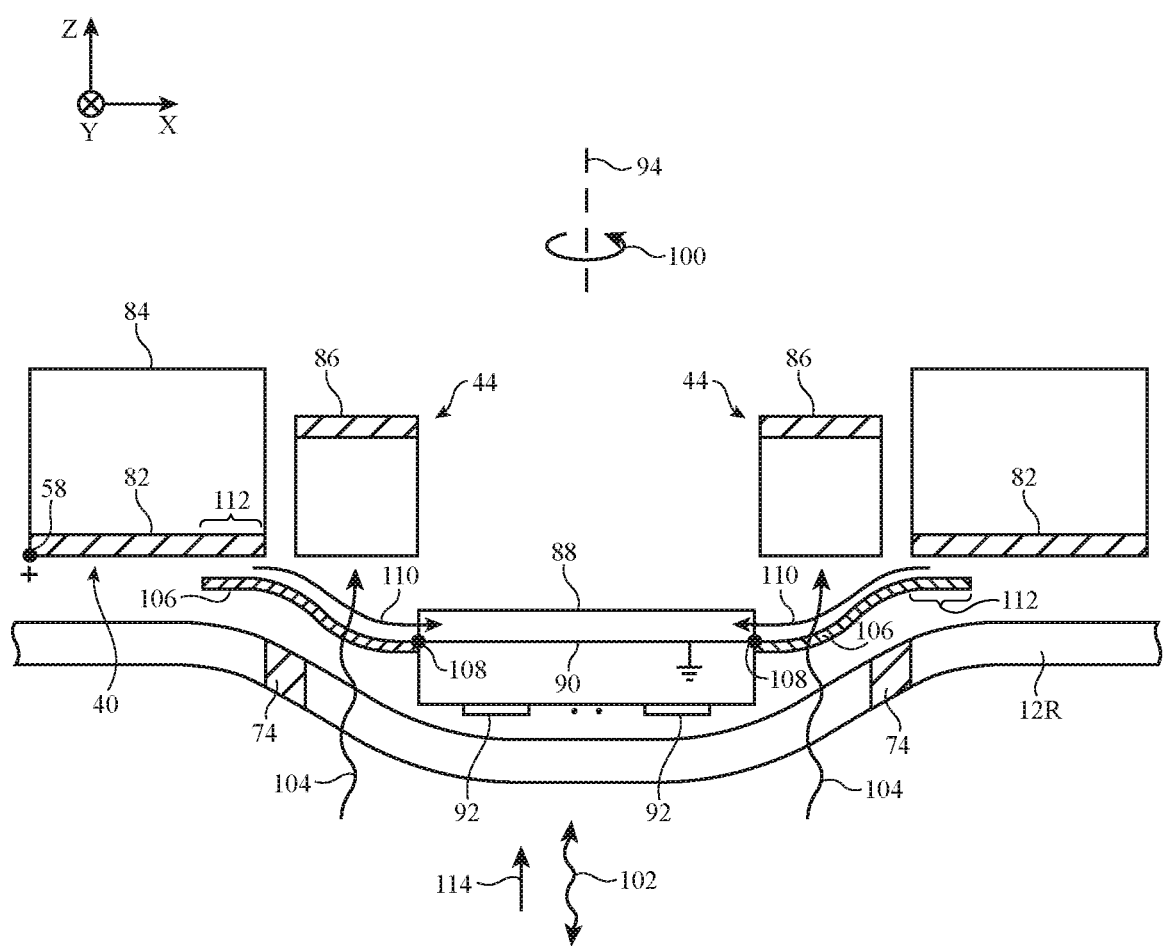
FIG. 5 is a cross-sectional side view of an illustrative electronic device having antenna grounding ring structures in accordance with some embodiments.

FIG. 5 is a cross-sectional side view showing how antenna grounding ring structures may be used to allow antenna 40 to include ground traces 90 without introducing signal losses associated with coil structures 44 (e.g., within region 98 of FIG. 4). As shown in FIG. 5, coil structures 44 may receive wireless charging signals 104 through rear housing wall 12R. Device 10 may include antenna grounding ring structures such as antenna grounding ring structures 106. Antenna grounding ring structures 106 may follow a ring-shaped path that laterally extends around central axis 94 and sensor board 88, as shown by arrow 100. Antenna grounding ring structures 106 may laterally surround sensor board 88 or may surround an opening that overlaps sensor board 88 (e.g., antenna grounding ring structures 106 may have a central opening and sensor board 88 may be mounted within or overlapping the central opening). Antenna grounding ring structures 106 may sometimes be referred to herein as grounding ring structures 106, antenna grounding structures 106, or electric field (E) shield 106.

Grounding ring structures 106 may include conductive traces or any other desired conductive materials. If desired, grounding ring structures 106 may include a substrate such as a flexible printed circuit substrate for the conductive traces in grounding ring structures 106. The inner edge of grounding ring structures 106 may have one or more grounding terminals 108 coupled to ground traces 90 on sensor board 88. The opposing outer edge of grounding ring structures 106 may overlap antenna resonating element 82. For example, peripheral region 112 of grounding ring structures 106 may overlap antenna resonating element 82.

While antenna 40 is conveying radio-frequency signals 102 through rear housing wall 12R, corresponding antenna currents flow along the edges of antenna resonating element 82. Some of these antenna currents may flow from the inner edge of antenna resonating element 82 and through grounding ring structures 106 to ground traces 90, as shown by arrows 110. These antenna currents may be coupled from antenna resonating element 82 onto grounding ring structures 106 via capacitive coupling, for example. If desired, the size of region 112 may be selected to tune the amount of capacitive coupling provided between antenna resonating element 82 and grounding ring structures 106.

Grounding ring structures 106 may form a short path to ground traces 90 other than through coil structures 44, thereby preventing radio-frequency signals 102 from inducing currents on coil structures 44. Because currents are not induced on coil structures 44 by radio-frequency signals 102, there may be negligible or no signal loss due to the presence of ferrite structures 86, thereby maximizing the antenna efficiency for antenna 40. In this way, the antenna ground of antenna 40 may be extended to also include grounding ring structures 106 and ground traces 90 (e.g., antenna 40 may include ground traces 90 and grounding ring structures 106), thereby maximizing the volume of antenna 40 and thus antenna efficiency, without introducing signal losses due to the presence of ferrite structures 86 in coil structures 44.

Figure 6:
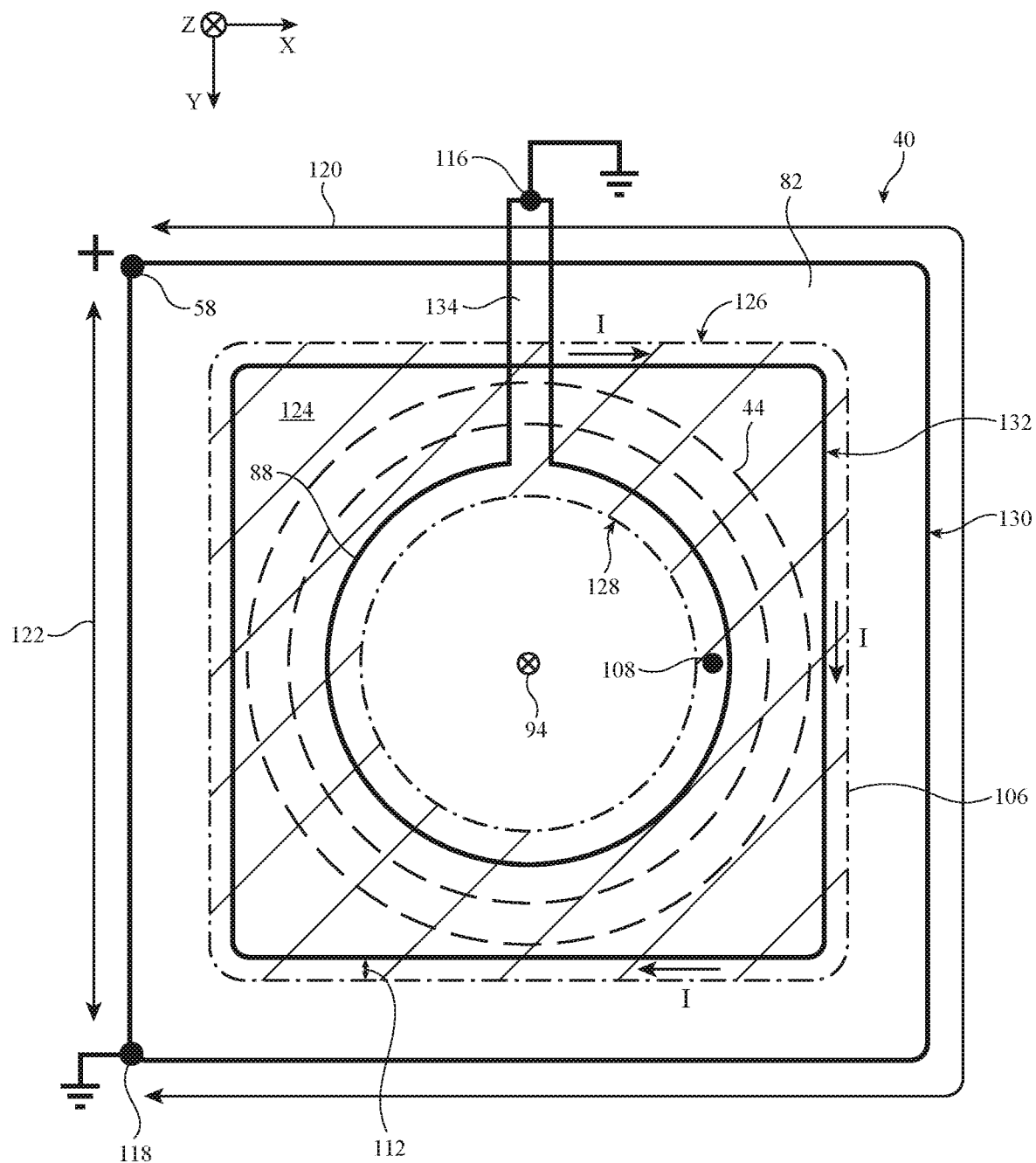
FIG. 6 is a bottom-up view showing how illustrative antenna grounding ring structures may overlap wireless charging coil structures and an antenna resonating element in accordance with some embodiments.

FIG. 6 is a bottom-up view of antenna resonating element 82, grounding ring structures 106, coil structures 44, and sensor board 88 (e.g., as taken in the direction of arrow 114 of FIG. 5, where rear housing wall 12R has been omitted for the sake of clarity). As shown in FIG. 6, antenna resonating element 82 may laterally extend along a loop-shaped path extending around a central opening 124. Positive antenna terminal 58 may be coupled to outer edge 130 of antenna resonating element 82 or elsewhere on antenna resonating element 82. Sensor board 88, grounding ring structures 106, and coil structures 44 may overlap opening 124.

Grounding ring structures 106 and coil structures 44 may laterally extend along loop-shaped paths around central axis 94. Antenna resonating element 82 may lie within a surface that is vertically interposed (e.g., along the Z-axis) between coil structures 44 and antenna resonating element 82. The conductive material in antenna resonating element 82 may overlap region 112 of grounding ring structures 106 (e.g., inner edge 132 of antenna resonating element 82 may overlap grounding ring structures 106). Grounding ring structures 106, shown in FIG. 6 as a shaded region extending between outer edge 126 and inner edge 128, may be coupled to ground traces on sensor board 88 (e.g., ground traces 90 of FIG. 5) at ground terminal 108. Ground terminal 108 may, for example, short inner edge 128 of grounding ring structures 106 to the ground traces in sensor board 88.

If desired, outer edge 130 of antenna resonating element 82 may be coupled to the antenna ground for antenna 40 via one or more ground terminals 118. Antenna resonating element 82 may laterally extend along a loop-shaped path. The length 120 of the loop-shaped path from positive antenna feed terminal 58 to ground terminal 118 may be selected to configure antenna 40 to radiate within a first frequency band. For example, length 120 may be selected to be approximately (e.g., within 15% of) one-half of the effective wavelength corresponding to a frequency in the first frequency band (e.g., an effective wavelength that is modified from a free space wavelength by a constant factor based on the dielectric properties of the materials in the vicinity of antenna resonating element 82). If desired, one or more harmonic modes (e.g., a third order harmonic) of length 120 may radiate in a second frequency band that is higher than the first frequency band. In one suitable arrangement that is sometimes described herein as an example, the first frequency band may be a cellular low band from 600 MHz to 960 MHz whereas the second frequency band may include a cellular midband and/or a cellular high band extending from about 1710 MHz to 2700 MHz. If desired, other portions of antenna resonating element 82 such as length 122 may also contribute to radiation by antenna 40 in the second frequency band.

As shown in FIG. 6, while conveying radio-frequency signals (e.g., radio-frequency signals 102 of FIG. 5), corresponding antenna currents I may flow around the edges of antenna resonating element 82. Antenna currents I may be capacitively coupled onto grounding ring structures 106 (e.g., within region 112). Grounding ring structures 106 may short antenna currents I to the ground traces on sensor board 88 via grounding terminal 108 (e.g., without inducing currents on coil structures 44 that introduce signal losses to the antenna). The ground traces on sensor board 88 may, for example, be coupled to other ground structures in the antenna ground for antenna 40 via ground terminal 116. Sensor board 88 may, for example, have a tail portion 134 that includes ground terminal 116.

The example of FIG. 6 is merely illustrative. Antenna resonating element 82, grounding ring structures 106, coil structures 44, and sensor board 88 may have other shapes (e.g., rectangular shapes, square shapes, circular shapes, rectangular shapes having curved corners, elliptical shapes, free-form shapes, etc.). For example, outer edge 130 of antenna resonating element 82, inner edge 132 of antenna resonating element 82, outer edge 126 of grounding ring structures 106, inner edge 128 of grounding ring structures 106, and coil structures 44 may follow any desired curved and/or straight paths.

Figure 7:
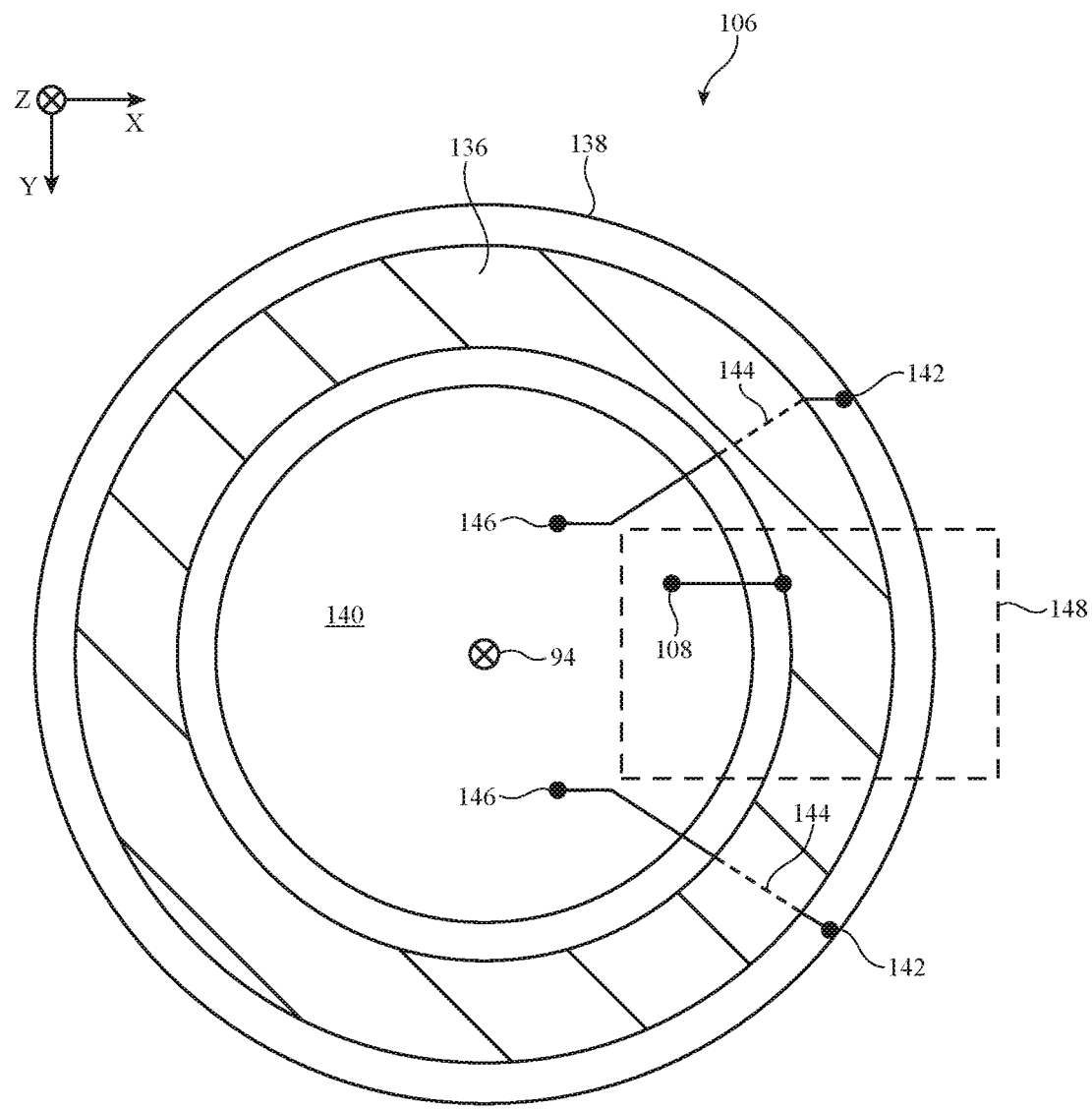
FIG. 7 is a bottom-up view showing how illustrative antenna grounding ring structures may be formed on a flexible printed circuit substrate in accordance with some embodiments.

FIG. 7 is a bottom-up view showing how grounding ring structures 106 may include conductive traces on a dielectric substrate. As shown in FIG. 7, grounding ring structures 106 may include conductive traces 136 on a dielectric substrate such as substrate 138. Substrate 138 may be a flexible printed circuit substrate, a rigid printed circuit board, a plastic substrate, or any other desired substrate. Substrate 138 and conductive traces 136 may, for example, follow a ring-shaped path that loops around central axis 94. If desired, substrate 138 may include an opening 140 that overlaps central axis 94. Opening 140 may be omitted if desired.

Ground terminal 108 may be coupled to the inner edge of conductive traces 136. Ground terminal 108 may, if desired, include conductive traces (e.g., traces and/or conductive contact pads on substrate 138), solder, conductive vias, conductive welds, conductive adhesive, conductive pins, conductive springs, and/or any other desired conductive interconnect structures that couple conductive traces 136 to the ground traces 90 on sensor board 88 (FIG. 5). Grounding ring structures 106 may include multiple ground terminals 108 if desired.

In one suitable arrangement, conductive traces for other components such as conductive traces 144 may be patterned onto substrate 138. Conductive traces 144 may be coupled to sensor electrodes 74 of FIG. 5 at terminals 142 and may therefore sometimes be referred to herein as sensor traces 144. Terminals 142 may include conductive traces (e.g., traces and/or conductive contact pads on substrate 138), solder, conductive welds, conductive vias, conductive adhesive, conductive pins, conductive springs, and/or any other desired conductive interconnect structures that couple sensor traces 144 to sensor electrodes 74 of FIG. 5.

Sensor traces 144 may also be coupled to sensor circuitry on sensor board 88 of FIG. 5 via terminals 146. Terminals 146 may include conductive traces (e.g., traces and/or conductive contact pads on substrate 138), solder, conductive welds, conductive vias, conductive adhesive, conductive pins, conductive springs, and/or any other desired conductive interconnect structures that couple sensor traces 144 to sensor circuitry on sensor board 88 of FIG. 5. The sensor circuitry may, for example, include electrocardiogram sensor circuitry that gathers sensor information (e.g., electrocardiogram sensor information) using sensor electrodes 74 (FIG. 5) and sensor traces 144.

This example is merely illustrative and, in general, the sensor board may gather any desired sensor information from any desired sensors (e.g., sensors 92 of FIG. 5) through sensor traces 144 on substrate 138. Any desired number of sensor traces 144 may be formed on substrate 138. Substrate 138 may have any desired shape (e.g., any desired shape having any desired number of curved and/or straight edges).

In general, the more conductive material that is included in conductive traces 136, the greater the maximum antenna efficiency for antenna 40. However, if care is not taken, the conductive material in grounding ring structures 106 may electromagnetically shield coil structures 44 from receiving wireless charging signals (e.g., wireless charging signals 104 of FIG. 5), thereby limiting the overall wireless charging efficiency of device 10. In order to maximize antenna efficiency without excessively impairing wireless charging efficiency, conductive traces 136 may include multiple concentric ring traces that are separated by gaps on substrate 138.

Figure 8:
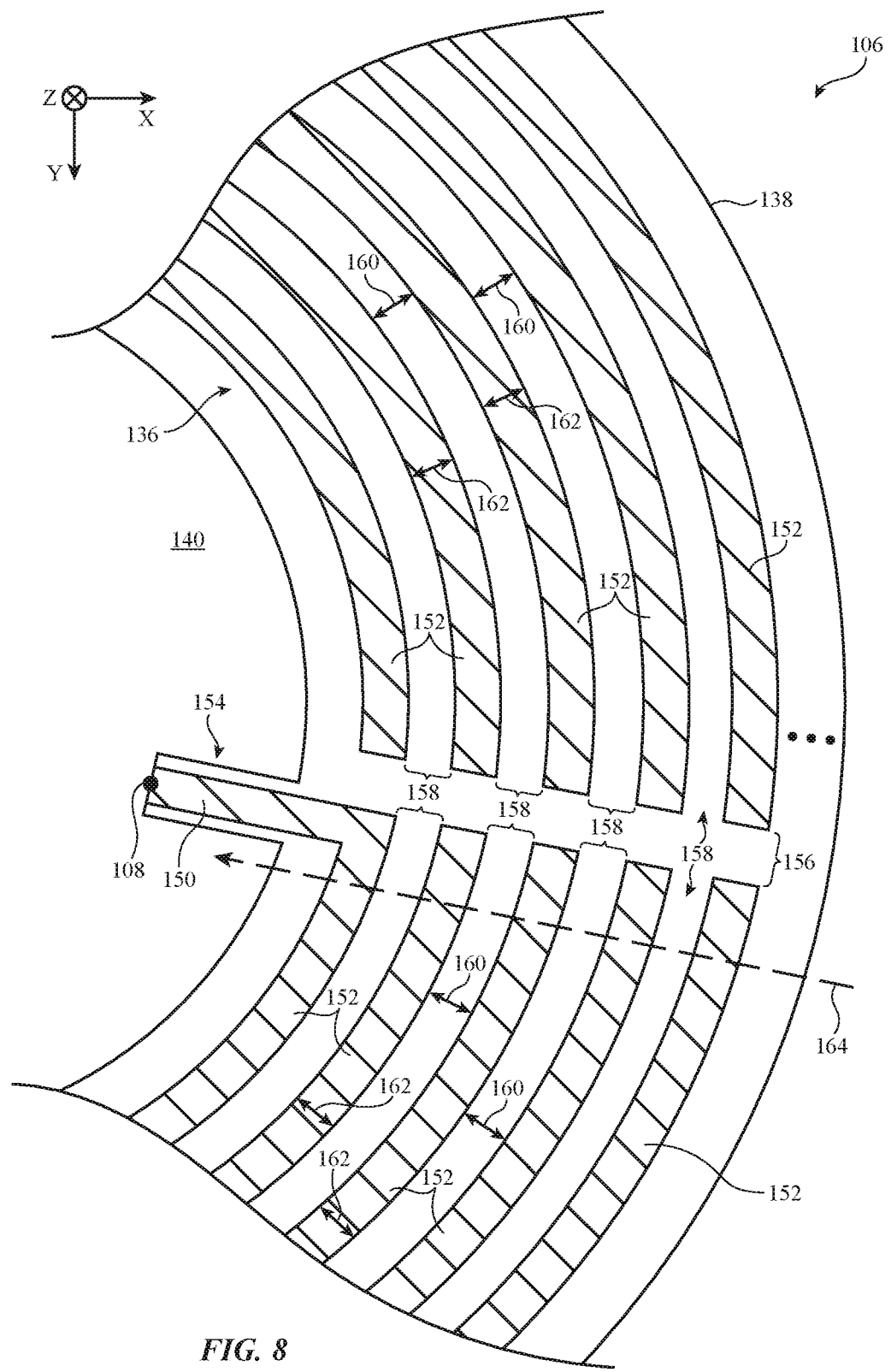
FIG. 8 is a bottom-up view showing how illustrative antenna grounding ring structures may include concentric rings of conductive traces separated by gaps in accordance with some embodiments.

FIG. 8 is a bottom-up view of grounding ring structures 106 showing how conductive traces 136 may include multiple concentric ring traces that are separated by gaps on substrate 138 (e.g., within region 148 of FIG. 7).

As shown in FIG. 8, conductive traces 136 in grounding ring structures 106 may include concentric ring-shaped traces 152 that are patterned onto substrate 138 and concentric about central axis 94 of FIG. 7. Each ring-shaped trace 152 of FIG. 8 may be formed from a (curved) segment of conductive traces on substrate 138 that loops around the central axis (e.g., that follow the ring shape of grounding ring structures 106). Each ring-shaped trace 152 in grounding ring structures 106 may be separated from one or two adjacent ring-shaped traces 152 by a corresponding gap 158 (e.g., concentric ring-shaped gaps in the conductive material of grounding ring structures 106 that loop around the central axis). The inner-most ring-shaped trace 152 in grounding ring structures 106 may be coupled to ground terminal 108 by conductive trace 150. Conductive trace 150 and ground terminal 108 may, for example, be formed on a tail of substrate 138 that protrudes into opening 140 such as tail 154.

Gaps 158 may be configured to allow antenna currents at relatively high frequencies such as the frequencies handled by antenna 40 to pass through grounding ring structures 106 to ground terminal 108 in the radial direction, as shown by arrow 164. At the same time, gaps 158 may be configured to prevent currents at relatively low frequencies such as the frequencies handled by coil structures 44 (FIGS. 5 and 6) from flowing in the radial direction across grounding ring structures 106 (e.g., ring-shaped traces 152 may exhibit a relatively low or short circuit impedance in the radial direction at the frequencies handled by antenna 40 while exhibiting a relatively high or open circuit impedance at the frequencies handled by coil structures 44). This may configure grounding ring structures 106 to allow wireless charging signals (e.g., wireless charging signals 104 of FIG. 5) to pass through grounding ring structures 106 without blocking reception of the wireless charging signals at coil structures 44.

Gaps 158 may have width 160 and ring-shaped traces 152 may have width 162 (e.g., measured in the radial direction about the central axis). Widths 160 and 162 may be selected to adjust the frequencies of the currents that face a relatively low or short circuit impedance to ground terminal 108 and the frequencies of the currents that face a relatively high or open circuit across grounding ring structures 106. Widths 160 and 162 may, for example, be selected to allow currents above 600 MHz (e.g., frequencies of the radio-frequency signals conveyed by antenna 40) to flow across gaps 158 to ground terminal 108 while also blocking currents below 1 MHz (e.g., frequencies of the wireless charging signals received by coil structures 44) from passing in the radial direction across gaps 158 and grounding ring structures 106. As examples, widths 160 and 162 may be 20-80 microns, 30-70 microns, 40-60 microns, 10-100 microns, less than 100 microns, or other dimensions. Width 160 may be equal to width 162 or may be different from width 162. Each gap 158 may have the same width 160 or different gaps 158 may have different widths. Each ring-shaped trace 152 may have the same width 162 or different ring-shaped traces 152 may have different widths. In this way, grounding ring structures 106 may serve to maximize the volume and efficiency bandwidth of antenna 40 without excessively impairing the wireless charging efficiency of coil structures 44.

Ring-shaped traces 152 may extend continuously around central axis 94 of FIG. 7 or may, if desired, include one or more splits such as splits 156 of FIG. 8 that divide the ring-shaped traces 152 about the central axis. Each ring-shaped trace 152 may include one or more splits 156 or, if desired, some ring-shaped traces 152 may be continuous without any splits. In one suitable arrangement as shown in the example of FIG. 8, the splits 156 in each ring-shaped trace 152 may be radially aligned with respect to the central axis. Each ring-shaped trace 152 may include any desired number of splits 156. Splits 156 may serve to prevent the wireless charging signals that pass through grounding ring structures 106 from producing undesirable eddy currents on ring-shaped traces 152. Ring-shaped traces 152 need not be curved and may follow any desired ring-shaped path around the central axis (e.g., ring-shaped traces 152 may include straight and/or curved segments following the ring-shaped path of grounding ring structures 106 about the central axis).

Figure 9:
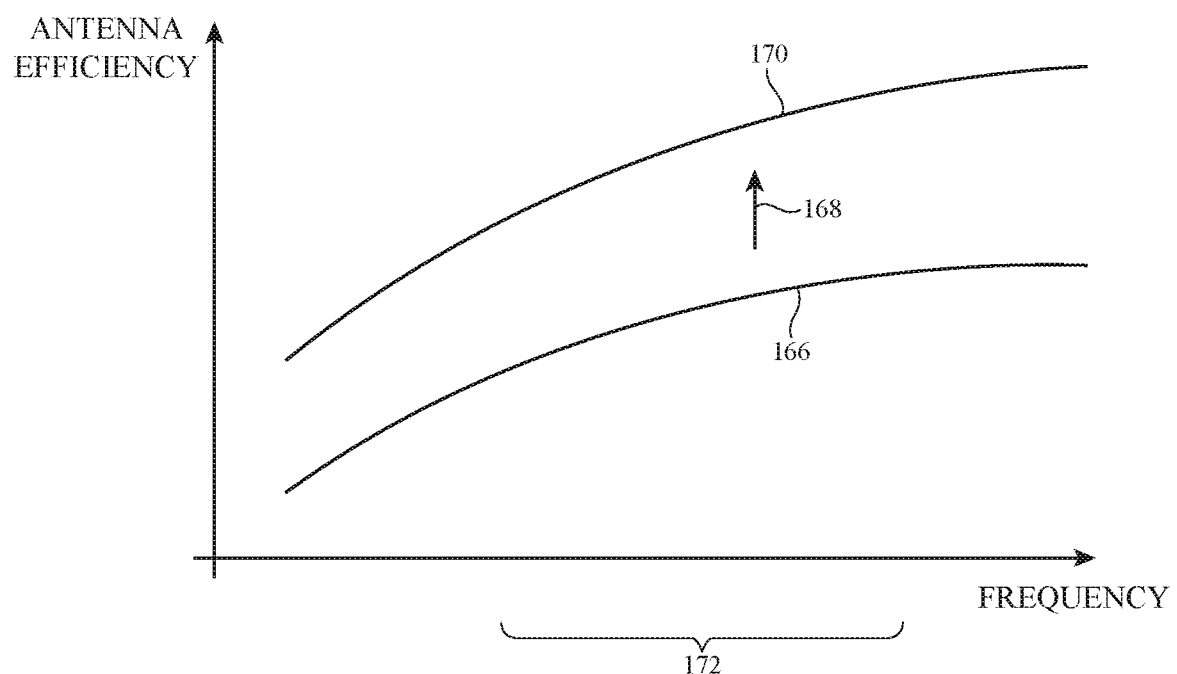
FIG. 9 is a plot of antenna performance (antenna efficiency) as a function of frequency showing how illustrative antenna grounding ring structures may optimize antenna efficiency for an antenna in accordance with some embodiments.

FIG. 9 is a plot of antenna efficiency as a function of frequency for antenna 40 of FIGS. 2-8. Curve 166 of FIG. 9 plots the antenna efficiency of antenna 40 without grounding ring structures 106 (e.g., curve 166 plots the antenna efficiency for antenna 40 in the arrangement of FIG. 4). As shown by curve 166, antenna 40 may exhibit a relatively low efficiency within the communications band(s) of operation (e.g., communications band(s) 172). Communications band(s) 172 may, for example, include the cellular low band from 600 MHz to 960 MHz. This relatively low efficiency may be a result of the radio-frequency signals conveyed by antenna 40 inducing currents on coil structures 44 that are blocked by ferrite structures 86.

Curve 170 plots the antenna efficiency of antenna 40 in the presence of grounding ring structures 106 (e.g., curve 170 plots the antenna efficiency for antenna 40 in the arrangement of FIGS. 5-8). As shown by curve 170, the presence of grounding ring structures 106 may serve to increase the antenna efficiency for antenna 40 within communications band(s) 172, as shown by arrow 168 (e.g., by 2-4 dB or more). This relatively high efficiency may be the result antenna currents being shorted to ground traces 90 on sensor board 88 through grounding ring structures 106 (FIG. 5), allowing radio-frequency signals to be conveyed by antenna 40 (e.g., radio-frequency signals 102 of FIG. 5) without incurring signal losses due to the presence of ferrite structures 86. The example of FIG. 9 is merely illustrative. Curves 170 and 166 may have any desired shapes and may exhibit one or more efficiency peaks in any desired number of communications bands at any desired frequencies.

Figure 10:
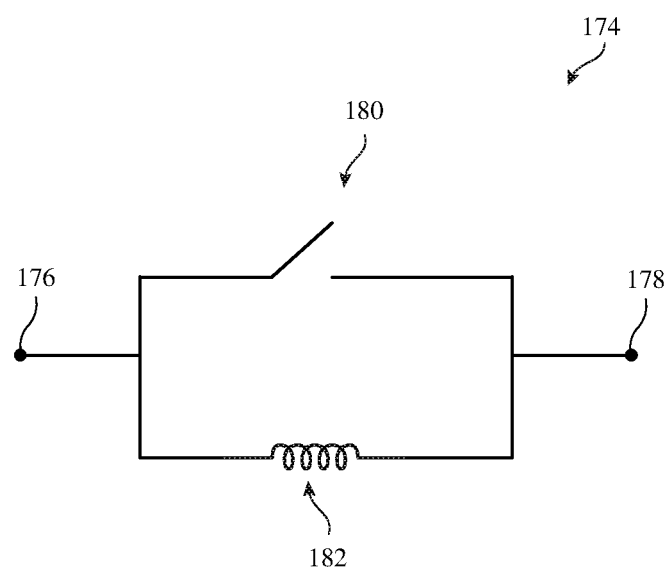
FIG. 10 is a circuit diagram of an illustrative switchable inductor that may couple grounding ring structures to ground traces on a sensor board in accordance with some embodiments.

Ground terminal 108 of FIGS. 6-8 may include conductive interconnect structures that couple grounding ring structures 106 to ground traces 90 on sensor board 88. The conductive interconnect structures may couple antenna current from a location on antenna resonating element 82 that is interposed between ground terminal 118 and positive antenna feed terminal 58 (e.g., at the right side of FIG. 6) onto ground traces 90. If desired, the conductive interconnect structures may include a switchable inductor for optimizing, adjusting, and/or tuning the low band performance of antenna 40. FIG. 10 is a circuit diagram of an illustrative switchable inductor 174 that may be used to couple grounding ring structures 106 to ground traces 90. Switchable inductor 174 may form ground terminal 108 of FIGS. 6-8, for example. As shown in FIG. 10, switchable inductor 174 may include a first terminal (port) 176 and a second terminal (port) 178. Terminal 176 may be coupled to grounding ring structures 106 (e.g., conductive traces 136 if FIGS. 7 and 8). Terminal 178 may be coupled to ground traces 90 on sensor board 88 or other portions of the antenna ground. If desired, terminal 178 may be secured to ground traces 90 and terminal 176 may be secured to grounding ring structures 106 using solder, welds, conductive adhesive, etc.

Switchable inductor 174 may include a radio-frequency switch such as switch 180 and an inductor such as inductor 182 coupled in parallel between terminals 176 and 178. Switch 180 may be a radio-frequency single-pole single-throw (SPST) switch, as an example. Switchable inductor 174 may have a first state in which switch 180 is open or turned off and a second state in which switch 180 is closed or turned on. Switches may be described herein as "closed" or "turned on" when control signals are provided to the switch (e.g., by control circuitry 28 of FIG. 2) that control the switch to form a very low impedance or a very high transconductance $g_m$ through the switch (e.g., an impedance that is less than a threshold impedance or a transconductance that exceeds a threshold transconductance). Switches may be described herein as "open" or "turned off" when the control signals control the switch to form a very high impedance or a very low transconductance $g_m$ through switch 180 (e.g., an impedance that exceeds a threshold impedance or a transconductance that is less than a threshold transconductance). Switch 180 may, for example, include a transistor such as a field effect transistor (FET) with a gate terminal that receives the control signal and with source/drain terminals coupled to terminals 176 and 178. Switch 180 may be toggled to adjust the radio-frequency performance of antenna 40 in one or more frequency bands such as in the cellular low band LB.

The example of FIG. 10 is merely illustrative. Switchable inductor 174 may include multiple series-coupled inductors (e.g., having different inductances) and switches coupled in parallel with switch 180 if desired. In these examples, switchable inductor 174 may have more than two states to allow for further tuning of the frequency response of antenna 40 in one or more bands. Other types of switching circuits may be used to form switch 180 if desired.

Figure 11:
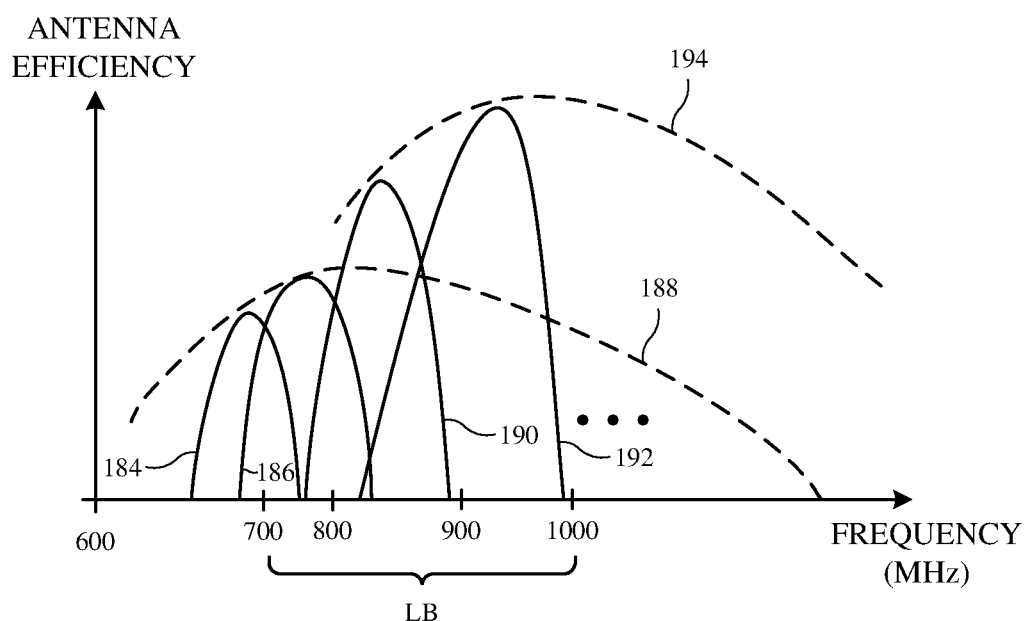
FIG. 11 is a plot of antenna efficiency as a function of frequency showing how a switchable inductor of the type shown in FIG. 10 may adjust antenna performance in accordance with some embodiments.

FIG. 11 is a plot showing how antenna performance (antenna efficiency) for antenna 40 as a function of frequency may be adjusted using switchable inductor 174. Curve 184 of FIG. 11 plots the antenna efficiency of antenna 40 when provided with a first antenna tuning setting (e.g., using one or more tuning circuits coupled to antenna 40) while switchable inductor 174 is in a first state where switch 180 is open. Curve 186 plots the antenna efficiency of antenna 40 when provided with a second antenna tuning setting (e.g., using one or more tuning circuits coupled to antenna 40) while switchable inductor 174 is in the first state. Adjusting the antenna tuning settings while switchable inductor 174 is in the first state may allow antenna 40 to cover frequencies as shown by envelope 188.

Curve 190 plots the antenna efficiency of antenna 40 when provided with the first antenna tuning setting but while switchable inductor 174 is in a second state where switch 180 is closed. Curve 192 plots the antenna efficiency of antenna 40 when provided with the second antenna tuning setting while switchable inductor 174 is in the second state. Adjusting the antenna tuning settings while switchable inductor 174 is in the second state may allow antenna 40 to cover frequencies as shown by envelope 194. As shown by envelopes 188 and 194, closing switch 180 may boost the radio-frequency performance of antenna 40 at higher frequencies in low band LB whereas opening switch 180 may allow antenna 40 to cover lower frequencies in low band LB (e.g., because switchable inductor 174 effectively adjusts the electrical length of antenna 40 to shift the roll-off frequency of the antenna). In other words, opening switch 180 may shift the roll-off frequency of antenna 40 to lower frequencies whereas closing switch 180 may shift the roll-off frequency of antenna 40 to higher frequencies. Adjusting switch 180 in this way may allow control circuitry 28 to actively tune antenna 40 to cover frequencies within low band LB such as to frequencies in LTE band B71 around 617 MHz, LTE band B17 around 710 MHz, LTE band B13 around 780 MHz, and LTE band B5 around 836 MHz as needed, for example. The example of FIG. 11 is merely illustrative. Curves 184-192 and envelopes 188 and 194 may have other shapes in practice. Switchable inductor 174 may be used to adjust the performance of antenna 40 in any frequency band covering any frequencies.

Additionally or alternatively, ground terminal 118 on antenna resonating element 82 of FIG. 6 may be coupled to the antenna ground (e.g., ground traces 90 in sensor board 88 or other ground structures) for antenna 40 using conductive interconnect structures. The conductive interconnect structures may include an inductor. The inductor may serve to extend the electrical length of antenna 40 (e.g., length 120 of FIG. 6).

Figure 12:
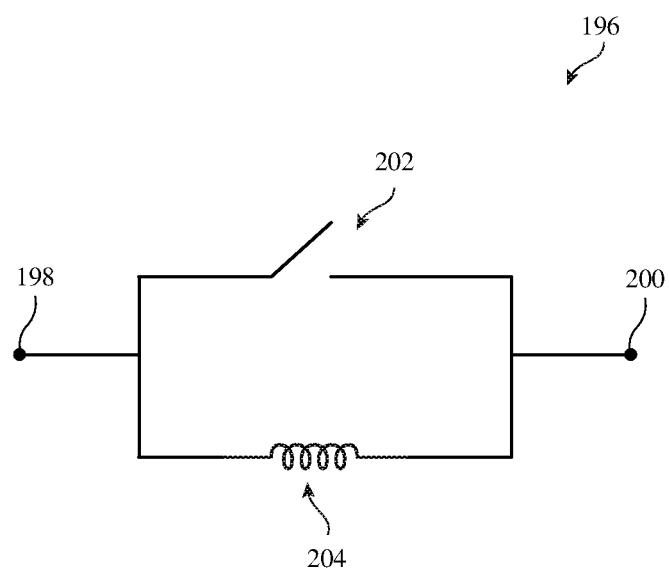
FIG. 12 is a circuit diagram of an illustrative switchable inductor that may couple an antenna resonating element to an antenna ground in accordance with some embodiments.

If desired, the inductor may be a switchable inductor such as switchable inductor 196 of FIG. 12. As shown in FIG. 12, switchable inductor 196 may include a first terminal 198 coupled to ground terminal 118 on antenna resonating element 82 (FIG. 6) and a second terminal 200 coupled to the antenna ground. If desired, terminal 198 may be secured to antenna resonating element 82 and terminal 200 may be secured to the antenna ground using solder, welds, conductive adhesive, etc. Switchable inductor 196 may include a radio-frequency switch such as switch 202 and an inductor such as inductor 204 coupled in parallel between terminals 198 and 200. Switch 202 may be a radio-frequency single-pole single-throw (SPST) switch, as an example. Switchable inductor 196 may have a first state in which switch 202 is closed or turned on and a second state in which switch 202 is open or turned off. Switch 202 may, for example, include a transistor such as a field effect transistor (FET) with a gate terminal that receives a control signal and with source/drain terminals coupled to terminals 198 and 200. Switch 202 may be toggled to adjust the radio-frequency performance of antenna 40 in one or more frequency bands such as in the cellular low band LB.

The example of FIG. 12 is merely illustrative. Switchable inductor 196 may include multiple series-coupled inductors (e.g., having different inductances) and switches coupled in parallel with switch 202 if desired. In these examples, switchable inductor 196 may have more than two states to allow for further tuning of the frequency response of antenna 40 in one or more bands. If desired, switch 202 may be coupled in series with inductor 204 between terminals 198 and 200. If desired, the conductive interconnect structure coupled between ground terminal 118 and the antenna ground may include a fixed inductor such as fixed inductor 206 of FIG. 13 (e.g., a fixed, discrete, inductor such as a surface-mount inductor or a distributed inductor formed from conductive traces coupled in series between terminals 198 and 200).

Figure 13:
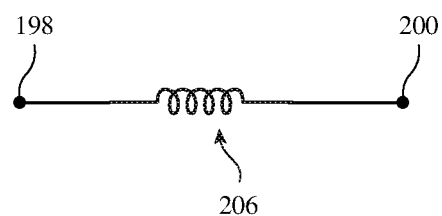
FIG. 13 is a circuit diagram of an illustrative fixed inductor that may couple an antenna resonating element to an antenna ground in accordance with some embodiments.
Figure 14:
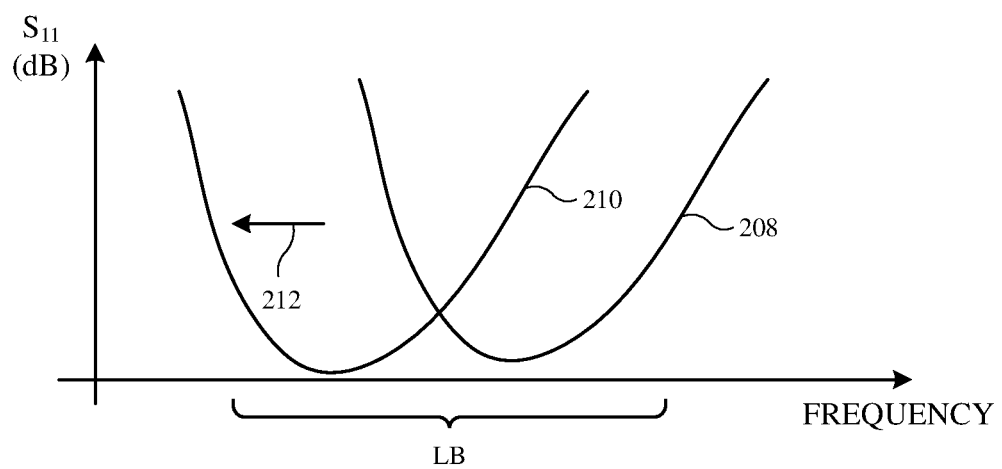
FIG. 14 is a plot of antenna performance (return loss) as a function of frequency showing how a switchable inductor of the type shown in FIG. 10 may be used to adjust antenna performance in accordance with some embodiments.

FIG. 14 is a plot showing how antenna performance (return loss $S_{11}$) for antenna 40 as a function of frequency may be adjusted using switchable inductor 196 of FIG. 12. Curve 208 of FIG. 14 plots the antenna efficiency of antenna 40 when provided with a first antenna tuning setting (e.g., using one or more tuning circuits coupled to antenna 40) while switchable inductor 196 is in a first state where switch 202 is closed. In some scenarios, the material used to form rear housing wall 12R may dielectrically load antenna 40 so that curve 186 does not cover desired frequencies within low band LB. For example, when housing wall 12R is formed from zirconia instead of plastic, curve 186 may not sufficiently cover lower frequencies in low band LB. Closing switch 202 may allow antenna current to bypass inductor 204, thereby preventing inductor 204 from adjusting the effective length of the antenna. Curve 210 plots the antenna efficiency of antenna 40 when provided with the first antenna tuning setting but while switchable inductor 196 is in a second state where switch 202 is open. As shown by curves 208 and 210, opening switch 202 may cause inductor 204 to effectively extend the length 120 of antenna 40 (FIG. 6), shifting the response of antenna 40 to lower frequencies in low band LB, as shown by arrow 212. In examples where a fixed inductor such as inductor 206 of FIG. 13 is coupled between ground terminal 118 and the antenna ground, curve 208 may correspond to the response of antenna 40 in the absence of the inductor and curve 210 may correspond to the response of antenna 40 in the presence of inductor 206 (e.g., because the inductance of inductor 206 may effectively increase the length 120 of antenna 40 in the low band). In other words, coupling an inductor between ground terminal 118 and the antenna ground may allow antenna 40 to cover lower frequencies in low band LB even under different dielectric loading conditions due to different materials that are used to form rear housing wall 12R. The example of FIG. 14 is merely illustrative. Curves 208 and 210 may have other shapes in practice. Switchable inductor 196 or fixed inductor 206 may be used to adjust the performance of antenna 40 in any frequency band covering any frequencies. Inductors 182, 204, and/or 206 may have an inductance of 10 nH or other inductances, for example.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device having opposing first and second faces, the electronic device comprising:
   a display at the first face;
   a housing having a housing wall at the second face;
   an antenna resonating element configured to radiate through the housing wall;
   a substrate in the housing;
   an antenna ground having a ground trace on the substrate;
   grounding structures configured to couple an antenna current on the antenna resonating element onto the ground trace on the substrate; and
   a switchable inductor coupled between the grounding structures and the ground trace.

2. The electronic device of claim 1, wherein the switchable inductor comprises:
   a first terminal coupled to the grounding structures;
   a second terminal coupled to the ground trace; and
   an inductor coupled between the first terminal and the second terminal.

3. The electronic device of claim 2, wherein the switchable inductor further comprises a switch coupled between the first terminal and the second terminal in parallel with the inductor.

4. The electronic device of claim 3, wherein the antenna is configured to radiate in a first frequency range when the switch is open and is configured to radiate in a second frequency range when the switch is closed.

5. The electronic device of claim 4, wherein the first frequency range is lower than the second frequency range.

6. The electronic device of claim 5, wherein the second frequency range comprises frequencies in a cellular low band less than 960 MHz.

7. The electronic device of claim 2, further comprising an additional inductor coupled between a ground terminal on the antenna resonating element and the ground trace.

8. The electronic device of claim 7, further comprising:
   a positive antenna feed terminal on the antenna resonating element, wherein the grounding structures are configured to couple, onto the ground trace, the antenna current at a location on the antenna resonating element that is interposed between the ground terminal and the positive antenna feed terminal.

9. The electronic device of claim 7, wherein the additional inductor is a fixed inductor.

10. The electronic device of claim 7, further comprising a switch coupled in parallel with the additional inductor between the ground terminal and the ground trace.

11. An electronic device having opposing first and second faces, the electronic device comprising:
    a display at the first face;
    a housing having a housing wall at the second face;
    an antenna resonating element configured to radiate through the housing wall;
    a sensor board having a sensor configured to gather sensor data through the housing wall;
    an antenna ground having a ground trace on the sensor board;
    grounding structures configured to couple an antenna current on the antenna resonating element onto the ground trace on the sensor board; and
    an inductor that couples a ground terminal on the antenna resonating element to the antenna ground.

12. The electronic device of claim 11, further comprising:
    a positive antenna feed terminal on the antenna resonating element, wherein the grounding structures are configured to couple, onto the ground trace, the antenna current at a location on the antenna resonating element that is interposed between the ground terminal and the positive antenna feed terminal.

13. The electronic device of claim 11, wherein the housing wall comprises zirconia.

14. The electronic device of claim 11, further comprising a switch coupled between the ground terminal and the antenna ground in parallel with the inductor.

15. The electronic device of claim 11, further comprising:
    an additional inductor that couples a point on the grounding structures to the ground trace.

16. The electronic device of claim 15, further comprising:
a switch coupled between the point on the grounding structures and the ground trace in parallel with the additional inductor.

17. The electronic device of claim 16, wherein the switch comprises a single-pole single-throw switch.

18. A wristwatch having a first face and a second face opposite the first face, the wristwatch comprising:
a display at the first face;
a housing wall at the second face;
an antenna resonating element configured to radiate through the housing wall;
a circuit board having a ground trace, wherein an axis extends through a lateral surface of the circuit board and the antenna resonating element laterally extends around the axis; and
a ring-shaped conductive trace laterally extending around the axis, wherein the ring-shaped conductive trace is configured to couple antenna current on the antenna resonating element onto the ground trace.

19. The wristwatch of claim 18, further comprising:
an inductor that couples the ring-shaped conductive trace to the ground trace.

20. The wristwatch of claim 18, further comprising:
an inductor that couples the antenna resonating element to the ground trace.

\* \* \* \* \*